United States Patent
Miyata et al.

(10) Patent No.: US 9,841,663 B2
(45) Date of Patent: Dec. 12, 2017

(54) LIGHT SOURCE APPARATUS AND PROJECTOR THAT SELECTIVELY OPENS AND CLOSES OPENINGS BASED ON POSTURE

(71) Applicant: SEIKO EPSON CORPORATION, Tokyo (JP)

(72) Inventors: Takahiro Miyata, Matsumoto (JP); Masahiro Saito, Shiojiri (JP); Satoru Nagarekawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 15 days.

(21) Appl. No.: 15/057,710

(22) Filed: Mar. 1, 2016

(65) Prior Publication Data

US 2016/0259233 A1   Sep. 8, 2016

(30) Foreign Application Priority Data

Mar. 6, 2015  (JP) .................................. 2015-044379
Sep. 18, 2015  (JP) .................................. 2015-184808

(51) Int. Cl.
  G03B 21/16  (2006.01)
  G03B 21/20  (2006.01)
  G03B 21/14  (2006.01)

(52) U.S. Cl.
  CPC ......... *G03B 21/16* (2013.01); *G03B 21/2026* (2013.01); *G03B 21/145* (2013.01)

(58) Field of Classification Search
  CPC ... G03B 21/16; G03B 21/145; G03B 21/2026
  See application file for complete search history.

(56) References Cited

U.S. PATENT DOCUMENTS

| 7,972,013 | B2 * | 7/2011 | Soma ...................... F21V 29/02 352/202 |
| 2009/0027626 | A1 * | 1/2009 | Chang ..................... G03B 21/16 353/52 |
| 2013/0314673 | A1 | 11/2013 | Tateno | |
| 2013/0329195 | A1 * | 12/2013 | Yamashita ............. G03B 21/16 353/61 |

FOREIGN PATENT DOCUMENTS

| JP | 2013-504442 A | 2/2013 |
| JP | 2013-246183 A | 12/2013 |
| WO | 2012/124053 A1 | 9/2012 |

* cited by examiner

*Primary Examiner* — Sultan Crowdhury
*Assistant Examiner* — Magda Cruz
(74) *Attorney, Agent, or Firm* — Oliff PLC

(57) ABSTRACT

A light source apparatus includes a light source, a light source enclosure that accommodates the light source and has a plurality of openings formed therein in a circumferential direction around an optical axis of the light source, a channel having an introduction port through which air is introduced from outside of the light source enclosure, the channel allowed to communicate with the plurality of openings, and an opening/closing mechanism that rotates around the optical axis to selectively open and close the plurality of openings, and the opening/closing mechanism has an opening/closing section that opens and closes the plurality of openings in a first posture in which the optical axis extends along a horizontal plane in such a way that upper openings located on a vertically upper side are open and at least part of lower openings located on a vertically lower side is closed.

11 Claims, 13 Drawing Sheets

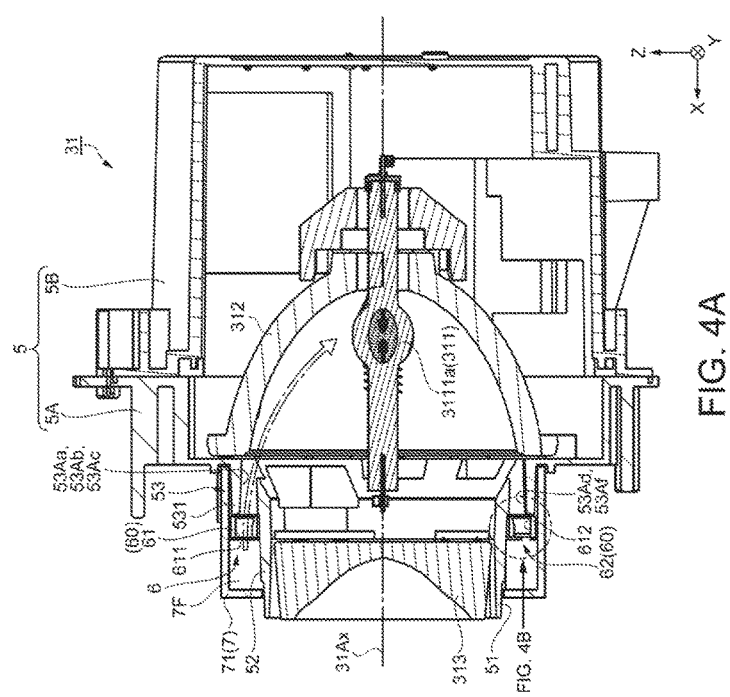
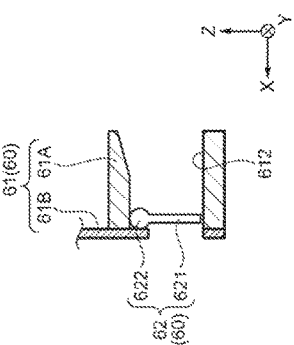
FIG. 4A
FIG. 4B

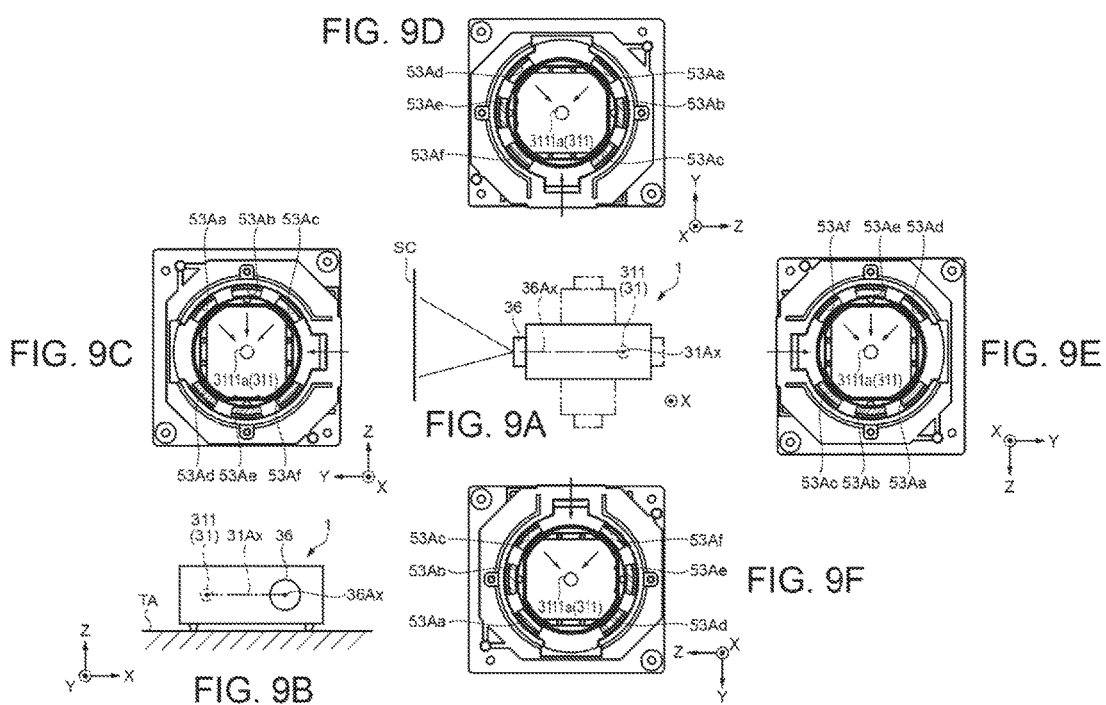

LIGHT SOURCE APPARATUS AND PROJECTOR THAT SELECTIVELY OPENS AND CLOSES OPENINGS BASED ON POSTURE

BACKGROUND

1. Technical Field

The present invention relates to a light source apparatus and a projector.

2. Related Art

There is a known projector of related art that modulates light output ted from a light source apparatus in accordance with image information and projects the modulated light on a screen or any other projection surface. The light source apparatus uses a discharge-type light source, such as an ultrahigh-pressure mercury lamp. The light source generates heat when it emits light, and the upper side of the light source is heated to a higher temperature than the lower side thereof due, for example, to heat convection. It is therefore desired to deliver cooling air from the side above the light source so that no temperature difference between the upper side and the lower side is created.

Further, to broaden the range over which the projector is used, there is a proposed technology for delivering cooling air from the side above the light source even when the projector is installed in a variety of postures (see JP-A-213-246183, for example).

The light source apparatus described in JP-A-213-246183 includes a light source, a reflector, a light source enclosure, and a rotary member.

The light source enclosure accommodates the light source and the reflector and has a plurality of introduction ports through which cooling air delivered from a cooling fan can be introduced and a plurality of outflow ports that communicate with the respective introduction ports. The plurality of introduction ports are arranged around the center axis provided in a position outside the reflector, and plurality of outflow ports are formed along an opening of the reflector.

The rotary member is formed in a circular shape in a plan view and so supported as to foe rotatable around the center axis of the light source enclosure. The rotary member has an opening that allows part of the plurality of introduction ports to be open.

The rotary member rotates in accordance with the posture of the light source apparatus, whereby the light source is cooled with cooling air delivered from the side vertically above the light source.

The light source apparatus described in JP-A-213-246183, however, has a configuration in which part of the cooling air delivered from a cooling fan, that is, cooling air having passed through the opening of the rotary member is used and is therefore problematic in that the cooling air blocked by the rotary member is not used. That is, the light source apparatus is problematic in that the capability of the cooling fan cannot be fully used. The technology described in JP-A-213-246183 can undesirably not only force the projector to employ a large cooling fan to cause an increase in size of the projector but also cause an increase in noise produced by the large cooling fan operating at high rotation speed.

SUMMARY

An advantage of some aspects of the invention is to solve at least a part of the problems described above, and the invention can be implemented as the following forms or application examples.

APPLICATION EXAMPLE 1

A light source apparatus according to this application example includes a light source, a light source enclosure that accommodates the light source and has a plurality of openings formed therein in a circumferential direction around an optical axis of the light source, a channel having an introduction port through which air is introduced from outside of the light source enclosure, the channel allowed to communicate with the plurality of openings, and an opening/closing mechanists that rotates around the optical axis to selectively open and close the plurality of openings, and the opening/closing mechanism has an opening/closing section that opens and closes the plurality of openings in a first posture in which the optical axis extends along a horizontal plane in such a way that upper openings located on a vertically upper side are open and at least part of lower openings located on a vertically lower side is closed.

According to the configuration described above, in which the light source apparatus includes the opening/closing mechanism described above, the air introduced through the introduction pert is directed toward the light source through upper openings that are selectively opened. Since the plurality of openings are provided in the circumferential direction around the optical axis, and the upper openings among the plurality of openings are located on the vertically upper side, a greater amount of the air introduced through the introduction port can be directed to the upper side of the light source than to the lower side of the light source. The light source apparatus, even when it is rotated but still in the first posture, can therefore appropriately cool the light source.

Further, since the light source apparatus is so configured that the opening/closing mechanism opens and closes the openings on the downstream side of the channel and the amount of air that flows in through the introduction port therefore does not need to be restricted, the air delivered from an external cooling fan can effectively used to cool the light source.

Therefore, the performance of the cooling fan is fully used to efficiently suppress degradation of the light source, whereby the light source apparatus can be used over a broadened range.

APPLICATION EXAMPLE 2

In the light source apparatus according to the application example described above, it is preferable that the light source enclosure has a support section having a cylindrical shape around the optical axis and a wall section that protrudes from the support section and has the plurality of openings formed therein, that the opening/closing section has an opening/closing body having an annular shape through which the support section is inserted, that the opening/closing body has a first air vent that opens the upper openings in the first posture, and that the opening/closing mechanism is rotatably supported by the support section with the support section inserted through the opening/closing body.

According to the configuration described above, since the light source enclosure and the opening/closing mechanism are formed as described above, the upper openings can be opened in the first posture in the simple structure. Further, the configuration described above allows arrangement of the opening/closing mechanism without significant protrusion of part of the light source apparatus, whereby the light source apparatus can be compact even when it includes the opening/closing mechanism.

APPLICATION EXAMPLE 3

It is preferable that the light source apparatus according to the application example described above further includes a duct member that forms, along with the light source enclosure, the channel, and the opening/closing mechanism is preferably disposed between the duct member and the wall section.

According to the configuration described above, the duct member can be configured to not only form, along with the light source enclosure, the channel but also rotatably support, along with the light source enclosure, the opening/closing mechanism in the direction along the optical axis. Formation of the channel and arrangement of the opening/closing mechanism are therefore achieved in the simple structure.

APPLICATION EXAMPLE 4

In the light source apparatus according to the application example described above, it is preferable that the opening/closing mechanism further includes a plurality of rotary members that protrude from an inner circumferential edge of the opening/closing body and are each supported by the opening/closing body rotatably around the a central axis parallel to the optical axis, and that the opening/closing mechanism rotates with the plurality of rotary members in contact with the support section.

According to the configuration described above, the opening/closing mechanism rotates via the rotary meters rotating on the support section. The opening/closing mechanism can therefore rotate against a small magnitude of resistance.

APPLICATION EXAMPLE 5

In the light source apparatus according to the application example described above, it is preferable that the opening/closing mechanism includes a weight disposed in the opening/closing body and on the opposite side of the optical axis facing away from the first air vent.

According to the configuration described above, since the opening/closing mechanism rotates in such a way that the weight is located at a vertically lower end under its own gravity, the first air vent of the opening/closing body can open the upper openings without a user's specific operation in the first posture. The light source apparatus can therefore appropriately cool the light source in the simple configuration without forcing the user to perform cumbersome operation.

APPLICATION EXAMPLE 6

In the light source apparatus according to the application example described above, it is preferable that the opening/closing body has a second air vent that overlaps with the lower openings in the first posture when viewed in a direction along the optical axis, that the opening/closing section includes an opening/closing auxiliary section that closes the second air vent in the first posture, and that the opening/closing auxiliary section is so supported by the opening/closing body as to open the second air vent in a second posture in which the optical axis intersects a horizontal plane.

According to the configuration described above, in the first posture, since the opening/closing auxiliary sect ion closes the second air vent, the air having flowed through the channel flows through the first air vent and travels through the upper openings toward the light source. In the second posture, in which the optical axis intersects a horizontal plane (at roughly right angles, for example), since the second air vent is open, the air having flowed through the channel is allowed to flow through the first and second air vents and travel through any of the plurality of openings toward side portions of the light source. Therefore, in the first and second postures, the light source apparatus can appropriately cool the light source.

APPLICATION EXAMPLE 7

A projector according to this application example includes the light source apparatus described above, a light modulator that modulates light having exited out of the light source apparatus, a projection optical apparatus that projects the light modulated by the light modulator, and a cooling fan that delivers cooling air to the light source apparatus.

According to the configuration described above, since the projector includes the light source apparatus described above, in any posture rotated around an axis parallel to the optical axis over a range from 0° to 360°, the projector can project an image with degradation of the light source suppressed. The projector can therefore perform stable image projection over a long period in a wide variety of applications because the projector is capable of not only projection on a projection surface along a wall but also projection in a variety of directions.

APPLICATION EXAMPLE 8

In the projector according to the application example described above, it is preferable that the light source and the projection optical apparatus are so disposed as to extend along optical axes thereof that intersect each other.

According to the configuration described above, since the light source and the projection optical apparatus are so disposed as to extend along the optical axes thereof that intersect each other, for example, at roughly right angles, the projector can project, in the first posture, for example, a horizontally elongated image and project a vertically elongated image in the second posture. The range over which the projector is used can therefore be broadened.

BRIEF DESCRIPTION OF THE DRAWINGS

The invention will be described with reference to the accompanying drawings, wherein like numbers reference like elements.

FIGS. 4A and 4B are cross-sectional views of the light source apparatus in the present embodiment.

FIGS. 9A to 9F describe an air flow in a first posture.

FIGS. 1A to 1C describe the air flow in a second posture.

DESCRIPTION OF EXEMPLARY EMBODIMENTS

A projector according to an embodiment of the invention will be described below with reference to the drawings.

The projector according to the present embodiment modulates light emitted from a light source in accordance with image information and enlarges and projects the modulated light on a screen or any other projection surface. The projector according to the present embodiment is so configured as to be installed on a desktop or any other surface and capable of taking not only a horizontally oriented posture in which a horizontally elongated image is projected on a projection surface along a wall surface but also a vertically oriented posture which is a posture rotated clockwise by 90° from the horizontally oriented posture when viewed from the side facing the projection surface and in which a vertically elongated image is projected on the projection surface. The projector according to the present embodiment, when it projects a horizontally elongated image, does not necessarily take the horizontally oriented posture but can perform the projection in a posture so rotated that the projection direction toward a wall surface is changed to the projection direction toward a floor or a ceiling (posture rotated over a range from 0° to 360°).

Primary Configuration of Projector

Figure 1:
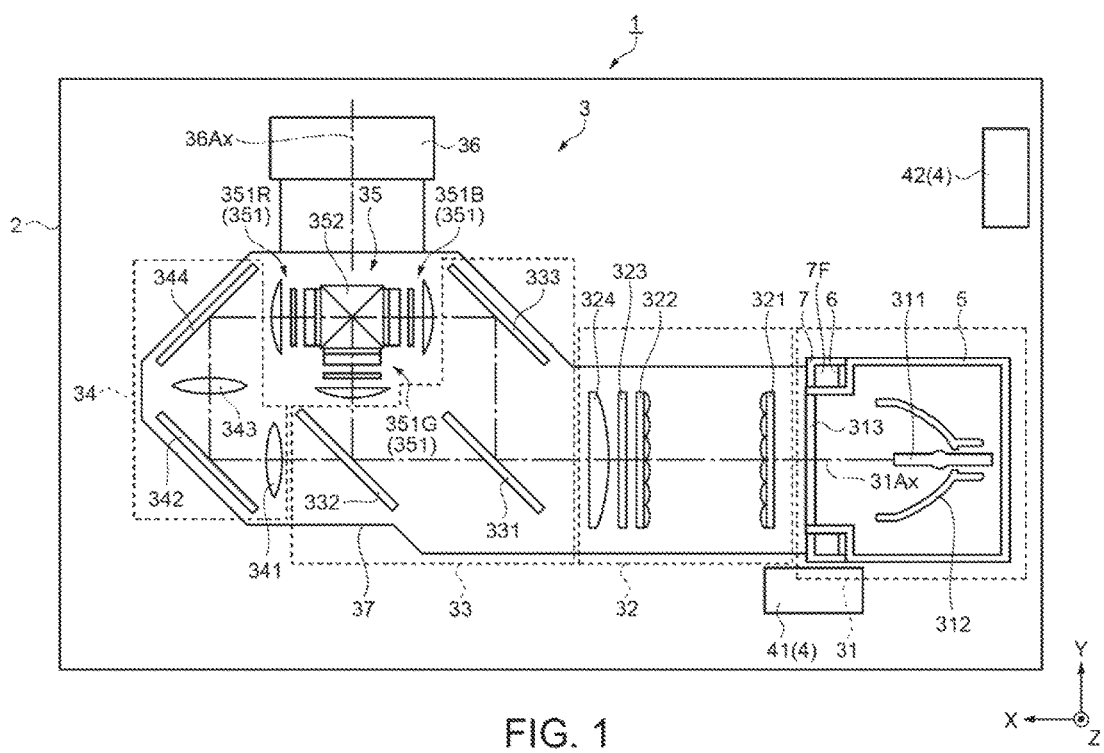
FIG. 1 is a diagrammatic view showing a schematic configuration of a projector according to an embodiment of the invention.

FIG. 1 is a diagrammatic view showing a schematic configuration of a projector 1 according to the present embodiment.

The projector 1 includes an exterior enclosure 2, which forms the exterior, a controller (not shown), an optical unit 3, which includes a light source 311, and a cooling apparatus 4, as shown in FIG. 1. Although not shown, a power supply that supplies the light source 311, the controller, the cooling apparatus 4, and other components with electric power and other sections are further disposed in the exterior enclosure 2.

The exterior enclosure 2, although not described in detail, is formed of a plurality of members and provided with an air intake port through which outside air is taken in, an air exhaust port through which heated air in the exterior enclosure 2 is exhausted out thereof, and other portions.

The controller includes a CPU (central processing unit), a ROM (read only memory), a RAM (random access memory), and other components, functions as a computer, and controls the action of the projector 1, for example, performs control relating to image projection, drives a fan provided in the cooling apparatus 4, and performs other types of control.

Configuration of Optical Unit

The optical unit 3 optically processes light outputted from a light source apparatus 31 and projects the processed light under the control of the controller.

The optical unit 3 includes the light source apparatus 31 having the light source 311, an optical integration illumination system 32, a color separation system 33, a relay system 34, an electro-optical apparatus 35, the projection lens 36 as a projection optical apparatus, and an optical part enclosure 37, in which the optical parts 31 to 36 are arranged in predetermined positions along the optical path, as shown in FIG. 1.

In the optical unit 3, the light source apparatus 31 is detachably disposed at one end of the optical unit 3 and the projection lens 36 is disposed at the other end of the optical unit 3, as shown in FIG. 1. The light source 311 and the projection lens 36 are so disposed as to extend in directions in which the optical axes thereof (reference character 31Ax denotes the optical axis of the light source 311, and reference character 36Ax denotes the optical axis of the projection lens 36) intersect each other, specifically, intersect each other at right angles in the present embodiment.

The projector 1 projects a horizontally elongated image in a first posture in which the optical axis 31Ax extends along a horizontal plane and projects a vertically elongated image in a second posture (vertically oriented posture) in which the optical axis 31Ax intersects the horizontal plane (at roughly right angles in the present embodiment). The first posture is not limited to the horizontally oriented posture and can be any posture in which the optical axis 31Ax extends along a horizontal plane and includes all postures created by rotation of the projector 1 in the horizontally oriented posture around an axis parallel to the optical axis 31Ax over a range from 0° to 360°. In the following description, the side toward which light is outputted from the light source apparatus 31 is called a +X side, the projection surface side is called +Y side (front side), and the vertically upper side in the horizontally oriented posture is called +Z side for ease of description.

The light source apparatus 31 includes the light source 311, which is a discharge-type light source formed, for example, of an ultrahigh-pressure mercury lamp or a metal halide lamp, a reflector 312, a parallelizing lens 313, alight source, enclosure 5, an opening/closing mechanism 6, and a duct member 7. In the light source apparatus 31, after the reflector 312 reflects light fluxes emitted from the light source 311, the parallelizing lens 313 aligns the directions of the reflected light fluxes with each other, and the aligned light fluxes are directed toward the optical integration illumination system 32.

Figure 2:
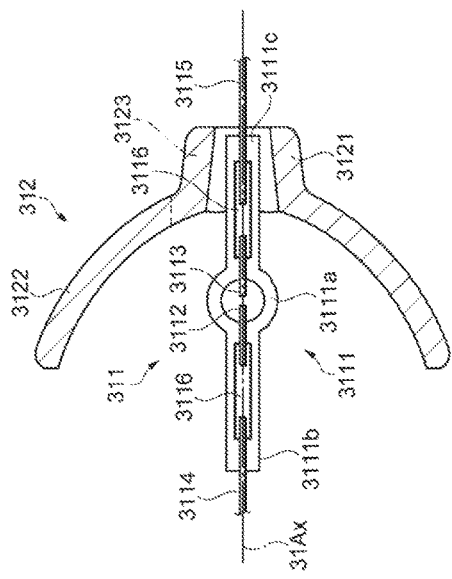
FIG. 2 is a cross-sectional view of a light source and a reflector in the present embodiment.

FIG. 2 is a cross-sectional view of the light source 311 and the reflector 312.

The light source 311 includes an arc tube 3111, a pair of electrodes 3112 and 3113, lead wires 3114 and 3115, and metal foils 3116 as shown in FIG. 2.

The arc tube 3111 is made of heat-resistant glass, such as quarts glass, and, as shown in FIG. 2, has a spherical light emitting section 3111a, which is provided at the center of the arc tube 3111, and a pair of sealing sections 3111b and 3111c, which extend from opposite sides of the light emitting section 3111a.

A discharge space that encapsulates mercury, a rare gas, a halogen, and other substances is formed in the light emitting section 3111a, and the pair of electrodes 3112 and 3113 are so disposed that the tips thereof closely face each other in the discharge space.

The metal foils 3116, which are provided in the form of a pair and electrically connected to the electrodes 3112 and 3113, respectively, are disposed in the pair of sealing sections 3111b and 3111c.

The lead wire 3114 has one end that is connected to the electrode 3112 via one of the metal foils 3116 and the other end that extends through and exits out of the sealing section 3111b. Similarly, the lead wire 3115 has one end that is connected to the electrode 3113 via the other metal foil 3116 and the other end that extends through and exits out of the sealing section 3111c. When electric power is supplied to the lead wires 3114 and 3115, discharge occurs between the electrodes 3112 and 31131 facing each other. The light source 311 thus emits light.

In the light source 311, since convection occurs due to heat generated in association with the discharge light emission, the arc produced between the pair of electrodes 3112 and 3113 facing each other is so located that the vertical center position thereof is shifted upward from the center position between the electrodes 3112 and 3113. In the light emitting section 3111a, the temperature therefore rises by a greater amount on the upper side than on the lower side. In particular, in the first posture, in which the optical axis 31Ax extends along a horizontal plane, the temperature in the vicinity of the upper surface of the light emitting section 3111a tends to rise.

In view of the fact described above, to suppress degradation of the light source, it is desired to primarily cool the upper side of the light emitting section 3111a in such a way that there is no difference in temperature between the upper side and the lower side of the light emitting section 3111a.

Further, the temperature of the sealing section 311b, which is located in a region through which the light emitted from the light emitting section 3111a passes, also tends to rise. For example, the temperature at the portion where the lead wire 3114 is connected to the metal foil 3116 greatly rises. Therefore, to cool the light source 311, it is desired to effectively cool not only the light emitting section 3111a but also the sealing section 3111b.

The reflector 312 has a neck-like section 3121, which has a tubular shape, and a reflection section 3122, which expands from the neck-like section 3121 in a roughly concave cross-sectional shape, as shown in FIG. 2.

The neck-like section 3121 is provided with an insertion hole through which one of the sealing sections or the sealing section 3111c is inserted, and the sealing section 3111b is located on the side opposite the neck-like section 3121. An adhesive is injected into the space between the sealing section 3111c and the insertion hole to fix the light source 311 to the reflector 312.

The reflection section 3122 has an inner surface on which a metal thin film is deposited, and the metal thin film reflects the light emitted from the light emitting section 3111a toward the side opposite the neck-like section 3121.

Further, the reflector 312 has an opening 3123 formed in part of the neck-like section 3121, and the opening 3123 opens from the inside to the outside of the reflection section 3122, as shown in FIG. 2.

Returning back to FIG. 1, the light source enclosure 5 accommodates the light source 311 and the reflector 312 and holds the parallelizing lens 313. The light source enclosure 5 is provided, for example, with a plurality of openings 53A (see FIGS. 5A and 5B), which will be described later, in the circumferential direction around the optical axis 31Ax.

The duct member 7, along with the light source enclosure 5, rotatably supports the opening/closing mechanism 6 and forms, along with the light source enclosure 5, a channel 7F, which is allowed to communicate with the plurality of openings 53A. The channel 7F has an introduction port 71G (see FIG. 3), through which air delivered from a cooling fan 41, which will be described later, in the cooling apparatus 4, and the introduction port 71G is so formed as to be allowed to communicate with the plurality of opening 53A.

The opening/closing mechanism 6 is supported by the light source enclosure 5 and the duct member 7 and configured to be rotatable around the optical axis 31Ax. The opening/closing mechanism 6 pivots under its own gravity in accordance with the posture of the projector 1 to selectively open and close the plurality of openings 53A in the light source enclosure 5. That is, the air delivered from the cooling fan 41 flows through the channel 7F, flows into the light source enclosure 5 through openings 53A, which are open in accordance with the posture of the projector 1, and cools the light source 311. The light source enclosure 5, the opening/closing mechanism 6, and the duct member 7 will be described later in detail.

The light source apparatus 31 includes a connector, although not shown, and the power supply supplies the light source 311 with electric power via the connector.

The optical integration illumination system 32 includes lens arrays 321 and 322, a polarization conversion element 323, and a superimposing lens 324, as shown in FIG. 1. The lens arrays 321 and 322 and the superimposing lens 324 roughly homogenize the light outputted from the light source apparatus 31 on the surfaces of liquid crystal light valves 351, which will be described later. The polarization conversion element 323 aligns the polarization directions of randomly polarized light fluxes having exited out of the lens array 322 with one another to form linearly polarized light that can be used by the liquid crystal light valves 351 as light modulators, which will be described later.

The color separation system 33 includes two dichroic mirrors 331 and 332 and a reflection mirror 333 and has a function of separating the light having exited out of the optical integration illumination system 32 into three color light fluxes, red light (hereinafter referred to as "R light"), green light (hereinafter referred to as "G light"), and blue light (hereinafter referred to as "B light").

The relay system 34 includes a light-incident-side lens 341, a relay lens 343, and reflection mirrors 342 and 344 and has a function of guiding the R light separated by the color separation system 33 to the liquid crystal light valve 351 for R light. The optical unit 3 has the configuration in which the relay system 34 guides the R light, but the relay system 34 does not necessarily guide the R light and may instead guide the B light.

The electro-optical apparatus 35 includes the liquid crystal light valves 351 and a cross dichroic prism 352, the latter of which serves as a light combining optical apparatus, modulates the color light fluxes separated by the color separation system 33 in accordance with image information, and combines the modulated color light fluxes with one another.

The liquid crystal light valves 351 are provided in correspondence with the three-color light fluxes (reference character 351R denotes the liquid crystal light valve for R light, reference character 351G denotes the liquid crystal light valve for G light, and reference character 351B denotes the liquid crystal light valve for B light) and each has a transmissive liquid crystal panel, a light-incident-side polarizer disposed on the light incident side of the liquid crystal panel, and a light-exiting-side polarizer disposed on the light exiting side of the liquid crystal panel.

Each of the liquid crystal light valves 351 has a rectangular pixel region in which minute pixels that are not shown are formed in a matrix, and the optical transmittance of each of the pixels is set in accordance with a display image signal so that a display image is formed in the pixel region. The color light fluxes separated by the color separation system 33 are modulated by the liquid crystal light valves 351 and then directed toward the cross dichroic prism 352.

The cross dichroic prism 352 is formed by bonding four rectangular prisms and therefore has a roughly square shape in a plan view, and two dielectric multilayer films are formed along the interfaces between the bonded rectangular prisms. The cross dichroic prism 352, in which the dielectric multilayer films reflect the color light fluxes modulated by the liquid crystal light valves 351R and 351B and transmit the color light flux modulated by the liquid crystal light valve 351G, combines the three color modulated light fluxes with one another.

The projection lens 36 includes a plurality of lenses (not shown) and enlarges and projects the combined light from the cross dichroic prism 352 on the projection surface.

The cooling apparatus 4 includes the cooling fan 41, which is disposed behind (on the −Y side of) the light source apparatus 31, an exhaust fan 42, which is disposed in front of (on the +Y side of) the light source apparatus 31, and an air intake fan, an air guiding member, and other components that are not shown.

The cooling fan 41 is a sirocco fan, which takes air therein in the direction a long the axis of rotation of the blades and delivers the air in the direction tangential to the rotation, and delivers the air to the light source apparatus 31 to cool the light source 311 and other components. The operation of the cooling fan 42 will be described later in detail.

The air intake fan that is not shown takes outside air therein through the air intake port of the exterior enclosure 2, and the taken-in outside air is guided along the member that is not shown to cool the liquid crystal light valves 351 and other optical components.

The exhaust fan 42 is, for example, an axial fan and exhausts the air that has cooled the light source apparatus 31, the liquid crystal light valves 351, and other components and has therefore been heated out of the exterior enclosure 2 through the exhaust port thereof.

Configurations of Light Source Enclosure, Opening/Closing Mechanism, and Duct Member The light source enclosure 5, the opening/closing mechanism 6, and the duct member 7 will now be described in detail.

The light source enclosure 5 will first be described.

Figure 3:
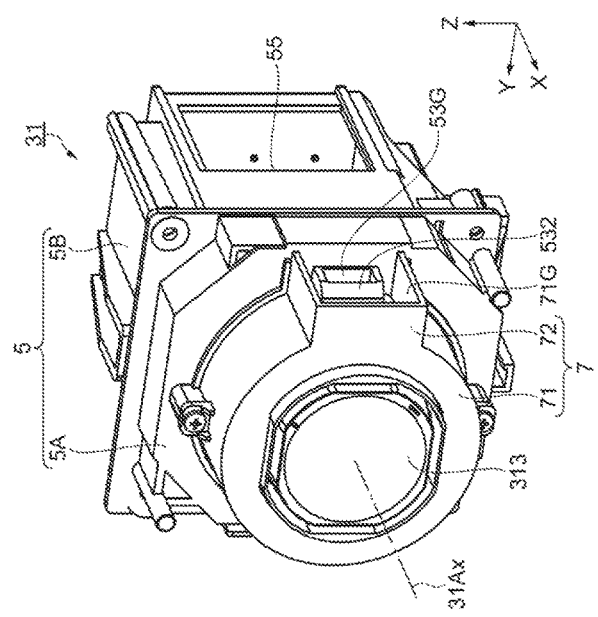
FIG. 3 is a perspective view of a light source apparatus in the present embodiment.

FIG. 3 is a perspective view of the light source apparatus 31. FIGS. 4A and 4B are cross-sectional views of the light source apparatus 31 in the horizontally oriented posture. FIG. 4A is a cross-sectional view of the light source apparatus 31 viewed from the −Y side, and FIG. 4B shows a state of an opening/closing auxiliary section 62, which will be described later, in the opening/closing mechanism 6.

The light source enclosure 5 includes an enclosure body 5A, which forms a +X-side portion of the light source enclosure 5, and a cover 5B, which forms a −X-side portion of the light source enclosure 5 and accommodates, along with the enclosure body 5A, the light source 311 and the reflector 312, as shown in FIGS. 3 and 4A.

Figure 5A:
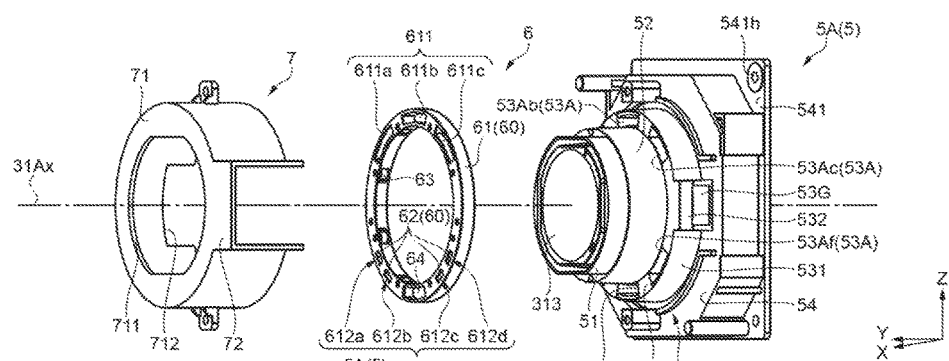
FIGS. 5A and 5B are perspective views of an enclosure body, an opening/closing mechanism, and a duct member in the present embodiment.
Figure 5B:
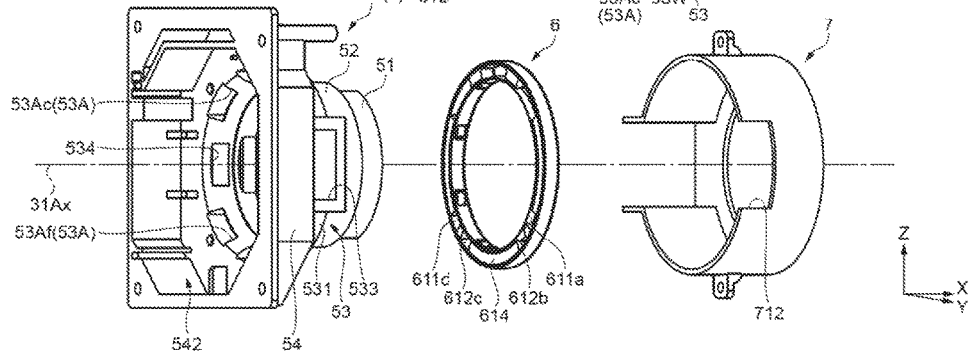

FIGS. 5A and 5B are perspective views of the enclosure body 5A, the opening/closing mechanism 6, and the duct member 7. FIG. 5A shows these components obliquely viewed from the +X side, and FIG. 5B shows these components obliquely viewed from the −X side.

The enclosure body 5A has a lens holding section 51, which holds the parallelizing lens 313, and a support section 52, an opening forming section 53, and a base section 54, which are sequentially formed on the −X side of the lens holding section 51, as shown in FIG. 5A.

The support section 52 is a portion that rotatably supports the opening/closing mechanism 6, has a tubular shape around the optical axis 31Ax, and protrudes from the outer circumferential surface of the lens holding section 51.

The opening forming section 53 has a tubular section 531, which protrudes from the outer circumferential surface of the support section 52, and a protruding section 532, which protrudes from the tubular section 531 in −Y direction.

The plurality of openings 53A are provided in a +X-side wall section 53W of the tubular section 531 and arranged in the circumferential direction around the optical axis 31Ax. The openings 53A are through holes passing through the enclosure body 5A from the outside to the inside thereof and so formed as to allow the air having flowed through the channel 7F to flaw into the enclosure body 5A.

Figure 6:
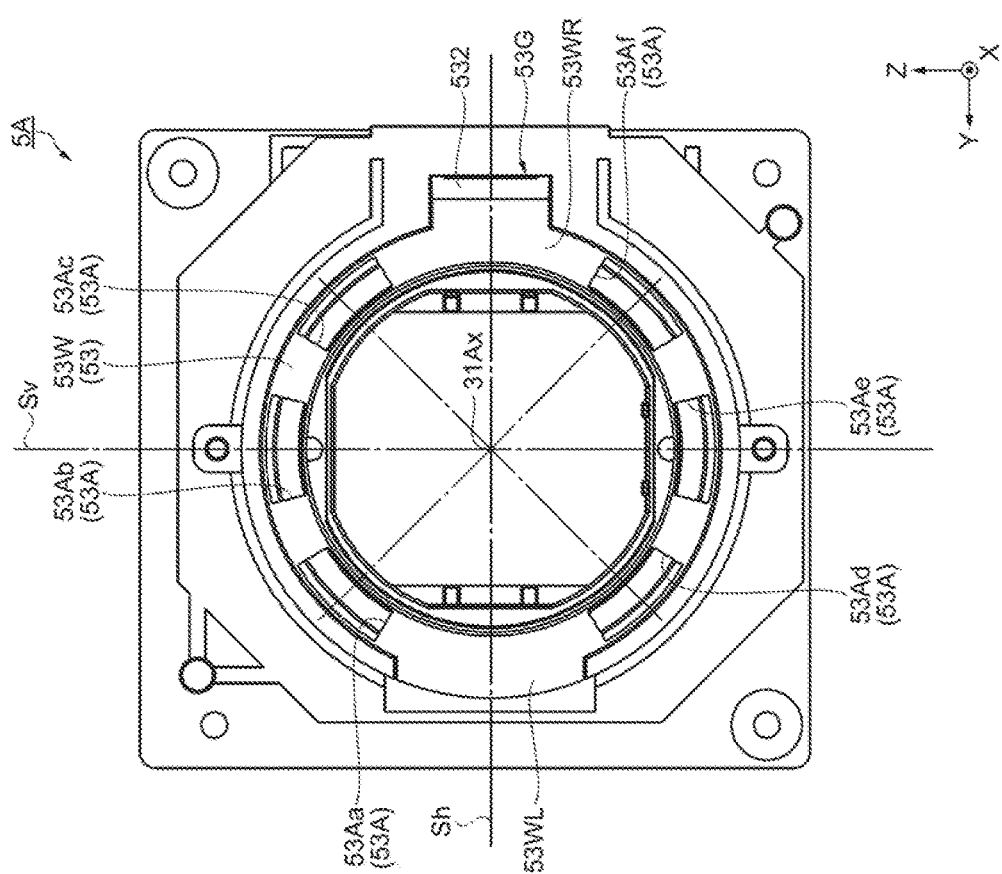
FIG. 6 is a plan view or the enclosure body in the present embodiment.

FIG. 6 is a plan view of the enclosure body 5A viewed from the +X side.

The plurality of openings 53A are formed on opposite sides of a horizontal plane Sh passing through the optical axis 31Ax in the horizontally oriented posture of the projector 1, as shown in FIG. 6. In the horizontally oriented posture of the projector 1, the plurality of openings 53A are arranged symmetrically with respect to the horizontal plane Sh and a vertical plane Sv passing through the optical axis 31Ax. Specifically, the plurality of openings 53A are formed of openings 53Aa, 53Ab, and 53Ac, which are located above the horizontal plane Sh, and openings 53Ad, 53Ae, and 53Af, which are located below the horizontal plane Sh, in the horizontally oriented posture of the projector 1. The openings 53Ab and 53Ae are so formed that the circumferential centers thereof are located on the vertical plane Sv, the openings 53Aa and 53Ad axe formed on the +Y side of the openings 53Ab and 53Ae, respectively, and the openings 53Ac and 53Af are formed on the −Y side of the openings 53Ab and 53Ae, respectively.

Further, the openings 53Aa, 53Ab, and 53Ac are so formed that the circumferential centers thereof are separated from each other by roughly 45°, and the openings 53Ad, 53Ae, and 53Af are so formed that the circumferential centers thereof are separated from each other by roughly 45°. A region 53WL of the wall section 53W between the openings 53Aa and 53Ad and a region 53WR of the wall section 53W between the openings 53Ac and 53Af are so formed as to be wider than the regions of the wall section 53W between the other openings 53A.

Returning back to FIGS. 5A and 5B, the protruding section 532 has a through hole formed therein and passing through the protruding section 532 in the ±Y direction. The −Y-side edge of the through hole forms an auxiliary introduction port 53G, through which part of the air delivered from the cooling fan 41 is introduced, and the +Y-side edge of the through hole forms a flow-in port 534, through which the air introduced through the auxiliary introduction port 53G flows into the light source enclosure 5. The flow-in port 534 is so formed as to be located on the −Y side of the sealing section 3111b (see FIG. 2) of the light source 311.

An exhaust port 53 3 is formed on the +Y side of the tubular section 531 and in a position facing the flow-in port 534, as shown in FIG. 5B. Part of the air introduced into the light source enclosure 5 is exhausted through the exhaust port 533. A mesh member that is not shown is disposed in the exhaust port 533 in preparation for a case where the arc tube 3111 is broken and configured to prevent broken pieces from spattering out of the light source apparatus 31. A mesh member that is not shown is also disposed in the auxiliary introduction port 53G.

The base section 54 protrudes from the outer surface of the opening forming section 53, and a flange 541 having a rectangular shape in a plan view is provided along the −X-side edge of the base section 54, as shown in FIG. 5A. Insertion holes 541h, through each of which a screw is inserted, are formed in diagonal positions at the four corners of the flange 541. The enclosure body 5A and the cover 5B are fixed to each other with the screws inserted through the insertion holes 541h.

The base section 54 has a recessed section 542, the portion inside the peripheral edge of which is recessed toward the +X side, and the recessed section 542 is so formed as to be connected to the inner surface of the opening forming section 53, as shown in FIG. 5B. The reflector 312 is disposed in the recessed section 542, and the light source 311 fixed to the reflector 312 is so provided that the tip of the sealing section 3111b (see FIG. 2) is disposed in the opening forming section 53.

The opening/closing mechanism 6 will next be described.

The opening/closing mechanism 6, through which the support section 52 of the enclosure body is inserted, is rotatably supported by the support section 52 around the optical axis 31Ax, as shown in FIG. 4A.

In the first posture of the projector 1, the opening/closing mechanism 6 selectively opens and closes the plurality of openings 53A in such a way that the air having flowed through the channel 7F is directed coward the tipper side of the light emitting section 3111a.

The opening/closing mechanism 6 includes an opening/closing section 6 having an opening/closing body 61 and opening/closing auxiliary sections 62, and the opening/closing auxiliary sections 62 are pivotably supported by the opening/closing body 61, as shown in FIGS. 5A and 5B.

Figure 7A:
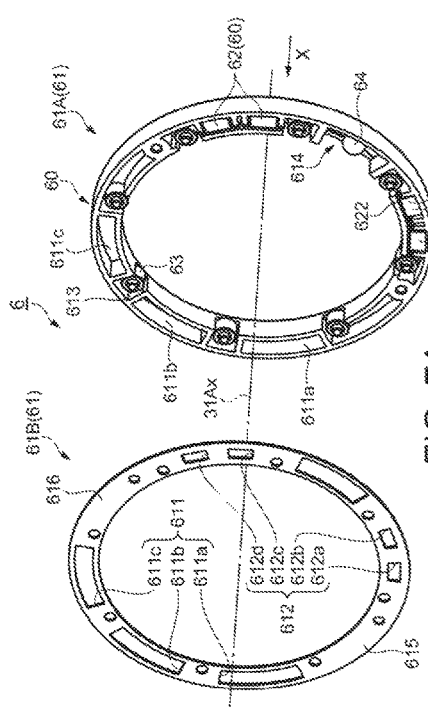
FIGS. 7A to 7E describe the opening/closing mechanism in the present embodiment.
Figure 7C:
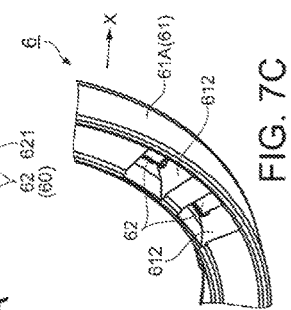
Figure 7E:
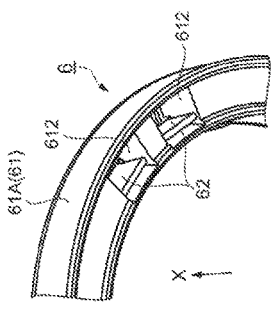
Figure 7B:
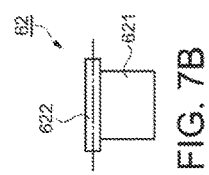
Figure 7D:
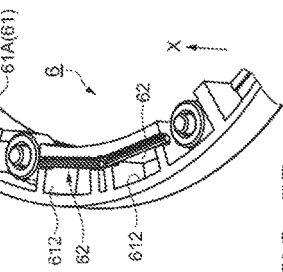

FIGS. 7A to 7E describe the opening/closing mechanism 6. Specifically, FIG. 7A is an exploded perspective view of the opening/closing mechanism 6 obliquely viewed from the +X side. FIG. 7B is a plan view of one of the opening/closing auxiliary sections 62. FIG. 7C is a partial perspective view of the opening/closing mechanism 6 in the first posture obliquely viewed from the −X side. FIG. 7D is a partial perspective view of the opening/closing mechanism 6 in the second posture obliquely viewed from the +X side with a holding plate 61B, which will be described later, removed. FIG. 7E is a partial perspective view of the opening/closing mechanism 6 in the second posture obliquely viewed from the −X side. FIG. 7A shows the state of the opening/closing auxiliary sections 62 in the first posture.

The opening/closing mechanism 6 further includes a rotary members 63 and a weight 64 in addition to the opening/closing section 6 having the opening/closing body 61 and the opening/closing auxiliary sections 62.

The opening/closing body 61 includes a body frame 61A and a holding plate 61B.

The body frame 61A accommodates the opening/closing auxiliary sections 62, the rotary members 63, and the weight 64. The holding plate 61B is fixed to the body frame 61A and supports, along with the body frame 61A, the opening/closing auxiliary sections 62, the rotary members 63, and the weight 64.

The opening/closing body 61 is formed in an annular shape formed around the optical axis 31Ax and having an inner diameter larger than the outer diameter of the support section 52 of the enclosure body 5A. The opening/closing mechanism 6 is disposed on the +X side of the wall section 53W (see FIG. 5A) with the support section 52 inserted through the opening/closing body 61.

First air vents 611 and second air vents 612 are formed in the opening/closing body 61, and support shafts 613 and a weight accommodating section 614 are formed in the body frame 61A, as shown in FIG. 7A.

The first air vents 611 and the second air vents 612 are formed of a plurality of air vents in the circumferential direction around the optical axis 31Ax in correspondence with the plurality of openings 53A in the enclosure body 5A.

Specifically, the first air vents 611 are formed of first air vents 611a, 611b, and 611c, which open the openings 53Aa, 53Ab, and 53Ac (see FIG. 6), respectively in the horizontally oriented posture. More specifically, the first air vents 611a, 611b, and 611c are so formed that the first air vent 611a is allowed to overlap with the opening 53Aa, the first air vent 611b is allowed to overlap with the opening 53Ab, and the first air vent 611c is allowed to overlap with the opening 53Ac when viewed in the direction along the optical axis 31Ax in the horizontally oriented posture.

The second air vents 612 are formed of second air vents 612a and 612b, which overlap with the opening 53Ad (see FIG. 6), and second air vents 612c and 612d, which overlap with the opening 53Af (see FIG. 6) when viewed in the direction along the optical axis 31Ax in the horizontally oriented posture. The second air vents 612a and 612b are arranged side by side in the circumferential direction around the optical axis 31Ax, and so are the second air vents 612c and 612d.

The opening/closing body 61 has no air vent between the second air vents 612b and 612c and therefore closes the opening 53Ae in the enclosure body 5A in the horizontally oriented posture. The opening/closing body 61 further has a closing section 615, which is provided between the first air vent 611a and the second air vent 612a, and a closing section 616, which is provided between the first air vent 611c and the second air vent 612d, as shown in FIG. 7A. The opening/closing body 61 is so configured in the horizontally oriented posture that the closing section 615 overlaps with the region 53WL (see FIG. 6) of the wall section 53W and the closing section 616 overlaps with the region S3WR (see FIG. 6) of the wall section 53W.

The support shafts 613 each have a central axis parallel to the optical axis 31Ax and are formed of a plurality of support shafts provided in the circumferential direction around the optical axis 31Ax, as shown in FIG. 7A. Each of the support shafts 613 rotatably supports the corresponding rotary member 63.

The weight accommodating section 614 is provided between the second air vents 612b arid 612c as shown in FIG. 5B, that is, on the opposite side of the optical axis 31Ax facing away from the first air vent 611b, as shown in FIG. 7A and accommodates the weight 64.

Each of the rotary members 63 has a cylindrical shape and has an insertion hole which is formed at the center of the rotary member 63 and through which the corresponding support shaft 613 is inserted. The rotary members 63 are rotatably supported by the plurality of respective support shafts 613, as shown in FIG. 7A. Part of the curved portion of each of the rotary members 63 protrudes from the inner circumferential edge of the opening/closing body 61, and the opening/closing mechanism 6 is so configured that the plurality of rotary members 63 come into contact with the support section 52 of the light source enclosure 5 and rotate. That is, the opening/closing mechanism 6 rotates against a small magnitude of resistance because it rotates via the rotary members 63.

The weight 64 is made of a metal, is disposed in the weight accommodating section 614 of the opening/closing body 61, and shifts the position of the center of gravity of the opening/closing mechanism 6 from the optical axis 31Ax toward the weight accommodating section 614. Since the weight 64 is disposed on the opposite side of the optical axis 31Ax facing away from the first air vent 611b (disposed in the weight accommodating section 614), the opening/closing body 61 is so positioned in the horizontally oriented posture that the first air vents 611a, 611b, and 611c close the openings 53Aa, 53Ab, and 53Ac (see FIG. 6).

As described above, the opening/closing mechanism 6, which rotates against a small magnitude of resistance and includes the weight 64, rotates under its own gravity when the posture of the projector 1 is changed in such a way that the weight 64 is located at the vertically lower end.

The opening/closing auxiliary sections 62 are provided in correspondence with the second air vents 612a, 612b, 612c, and 612d and open and close the second air vents 612a, 612b, 612c, and 612d in accordance with the posture of the projector 1.

Specifically, each of the opening/closing auxiliary sections 62 has a plate-shaped section 621, which has an oblong shape in a plan view, and a shaft section 622, which is formed along one long side of the plate-shaped section 612 and protrudes from the opposite short sides of the plate-shaped section 612, as shown in FIG. 7B. The shafts 622 are so disposed on the +X side of the body frame 61A as to face the optical axis 31Ax, and the holding plate 61B is placed toward the +X side of the opening/closing auxiliary sections 62 and fixed to the body frame 61A, as shown in FIG. 7A. The opening/closing auxiliary sections 62 are thus rotatably supported by the opening/closing body 61.

Each of the opening/closing auxiliary sections 62 then rotates under its own gravity in such a way that the front end of the plate-shaped section 621 is located below the shaft section 622. That is, in the first posture, the plate-shaped sections 621 are roughly perpendicular to the optical axis 31Ax, as shown in FIG. 7A, and close the second air vents 612, as shown in FIGS. 4B and 7C (In FIG. 7C, the second air vent 612c or 612d is not shown). In the second posture, the plate-shaped sections 621 are roughly parallel to the optical axis 31Ax and open the second air vents 612a, 612b, 612c, and 612d, as shown in FIGS. 7D and 7E (In FIGS. 7D and 7E, the second air vent 612c or 612d is not shown).

The duct member 7 will next be described.

The duct member 7 forms, along with the enclosure body 5A, the channel 7F, as described above.

The duct member 7 has an open −X side and further has a tubular section 71 and a protruding section 72, which protrudes from the −Y side of the tubular section 71 in the −Y direction, as shown in FIGS. 5A and 5B.

The tubular section 71 is so formed as to accommodate the opening/closing mechanism 6 and the opening forming section 53 of the enclosure body 5A, as shown in FIG. 4A, and has a +X side surface having the insertion hole 711, through which the lens holding section 51 of the enclosure body 5A is inserted, and a +Y side facing the protruding section 72 and provided with an exhaust port 712, which communicates with the exhaust port 533 of the enclosure body 5A, as shown in FIGS. 5A and 5B. Although not shown, a protrusion that restricts movement of the opening/closing mechanism 6 toward the +X side is formed on part of the inner surface of the tubular section 71. The opening/closing body 61 of the opening/closing mechanism 6 is disposed between the duct member 7 and the wall section 53W, that is, on the +X side of the openings 53A.

The protruding section 72 is open on the −Y side as well as on the −X side and so formed that the open region accommodates the protruding section 532 (auxiliary introduction port 53G) of the enclosure body 5A, as shown in FIG. 3. The protruding section 72 along with the protruding section 532 forms an opening that forms the introduction port 71G.

As described above, the introduction port 71G and the auxiliary introduction port 53G are both disposed on the −Y side of the light source apparatus 31.

After the support section 52 is inserted through the opening/closing mechanism 6, the duct member 7 is fixed to the enclosure body 5A with screws at upper and lower two locations, are shown in FIG. 3.

Figure 8:
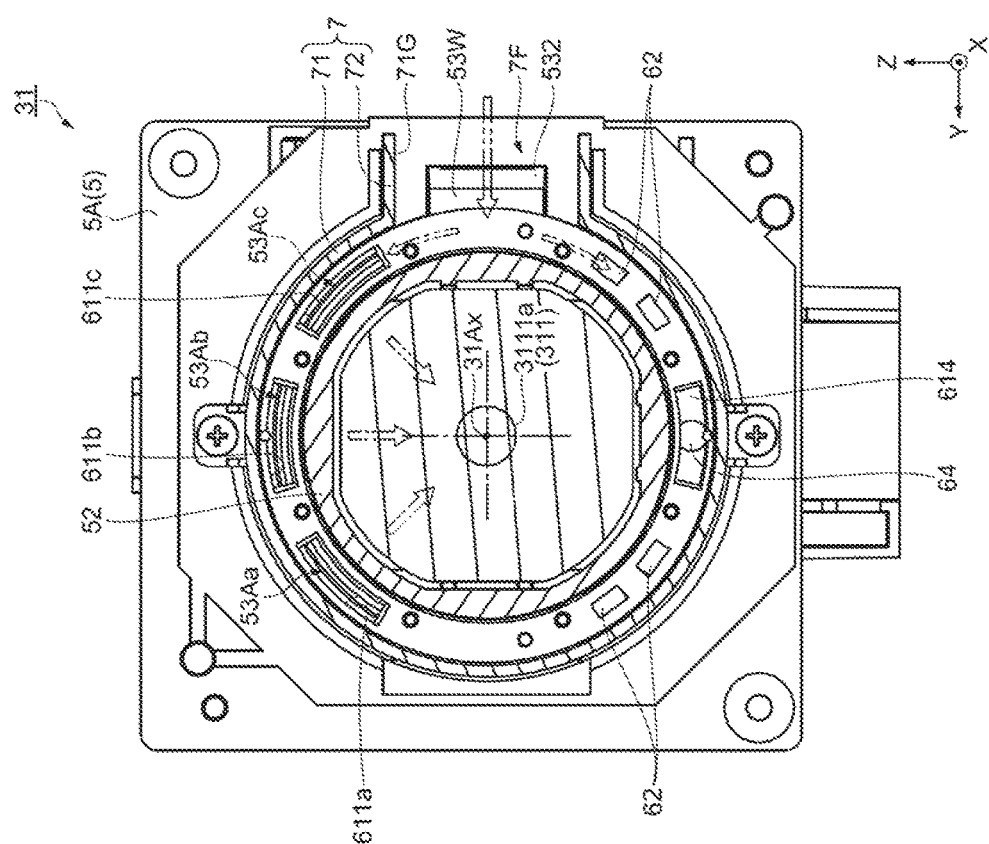
FIG. 8 is a cross-sectional view of the light source apparatus in the present embodiment.
Figure 10A:
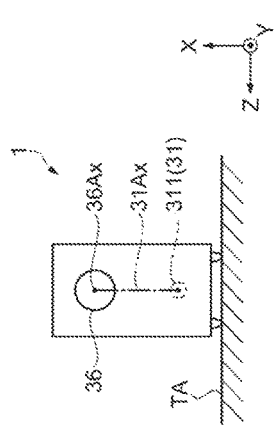
Figure 10B:
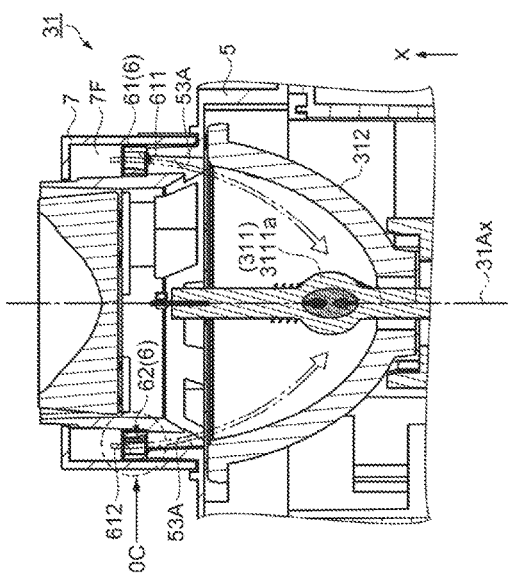
Figure 10C:
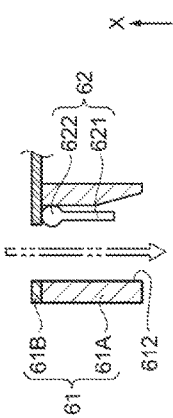

FIG. 8 is a cross-sectional view of the light source apparatus 31 taken along a Y-Z plane and shows the light source apparatus 31 in the horizontally oriented posture viewed from the +X side.

The channel 7F has an annular air flow portion provided between the support section 52/wall section 53W of the enclosure body 5A and the duct member 7, and the air flow portion is so formed as to communicate with the introduction port 71G, as shown in FIG. 8. The opening/closing mechanism 6 is disposed in the channel 7F and selectively opens and closes the plurality of openings 53A in accordance with the posture of the projector 1.

Returning back to FIG. 3, the cover 5B is so formed as to be joined with the flange 541 of the enclosure body 5A and covers the −X side of the reflector 312. The cover 5B is provided with an exhaust port 55 in each of the −Y-side and +Y-side wall portions, as shown in FIG. 3 (+Y-side exhaust port is not shown.).

Air Flow

The flow of the air delivered from the cooling fan 41 will now be described.

The air delivered from the cooling fan 41 flows in through the introduction port 71G and the auxiliary introduction port 53G and cools the light source apparatus 31.

The air having flowed in through the auxiliary introduction port 53G flows in through the flow-in port 534 (see FIG. 5B) into the light source enclosure 5 irrespective of the posture of the projector 1, travels toward the sealing section 3111b, and primarily cools the portion where the metal foil 3116 (see FIG. 2) and the lead wire 3114 (see FIG. 2) are connected to each other and other portions.

The air having flowed in through the introduction port 71G travels through openings 53A that are selectively opened in accordance with the posture of the projector 1 toward the light source 311.

The flow of the air having flowed in through the introduction port 71G will be described below.

The projector 1 is configured to be capable of performing projection in the first posture (including horizontally oriented posture) and the second posture (vertically oriented posture), and the opening/closing mechanism 6 selectively opens and closes the plurality of openings 53A in accordance with the posture of the projector 1, as described above.

The air flow in the light source apparatus 31 in the first posture will first be described by showing several postures that belong to the first posture by way of example.

FIGS. 9A to 9F describe the air flow in several postures that belong to the first posture, specifically, the horizontally oriented posture and postures created by sequential rotation of the horizontally oriented posture around an axis parallel to the optical axis 31Ax by 90°. Specifically, FIG. 9A is a diagrammatic view of the projector 1 in the first posture viewed from the +X side. In FIG. 9A, the projector 1 in the horizontally oriented posture is drawn with the solid line, and the projector 1 in other postures is drawn with chain double-dashed lines. FIG. 9B is a diagrammatic view of the projector 1 installed on an installation surface TA, such as a desktop, in the horizontally oriented posture and viewed from the +Y side. FIGS. 9C to 9F describe the state of the openings 53A in the light source apparatus 31 in each of the postures. FIG. 9C shows the state of the openings 53A in the horizontally oriented posture, and FIGS. 9D to 9F show the state of the openings 53A in the postures sequentially rotated from the horizontally oriented posture by 90°.

In the horizontally oriented posture, the optical axes 31Ax and 36Ax are roughly parallel to the installation surface TA, and the projector 1 projects a horizontally elongated image on a screen SC disposed along a wall surface, as shown in FIGS. 9A and 9B.

In the horizontally oriented posture, the opening/closing mechanism 6 opens the openings 53Aa, 53Ab, and 53Ac and closes the openings 53Ad, 53Ae, and 53Af, as shown in FIG. 9C. Specifically, the openings 53Aa, 53Ab, and 53Ac are open when they overlap with the first air vents 611a, 611b, and 611c when viewed from the +X side, the openings 53Ad and 53Af are closed when the opening/closing auxiliary sections 62 close the second air vents 612 (see FIGS. 4A and 4B), and the opening 53Ae is closed by the weight accommodating section 614 (see FIG. 8).

In the horizontally oriented posture, the plurality of openings 53A are grouped as follows: The openings 53Aa, 53Ab, and 53Ac are upper openings located on the vertically upper side; and the openings 53Ad, 53Ae, and 53Af are lower openings located on the vertically lower side.

The air having flowed through the channel 7F flows in through the openings 53Aa, 53Ab, and 53Ac into the light source enclosure 5, travels along the inner surface of the reflector 312, and is directed toward the upper side of the light emitting section 3111a, as shown in FIGS. 4A, 8, and 9C.

When the horizontally oriented posture is rotated around an axis parallel to the optical axis 31Ax by 90° (rotated clockwise when viewed from 'X side), the projector 1 takes an upward oriented posture that allows the projector 1 to perform projection toward a ceiling. The opening/closing mechanism 6 rotates when the horizontally oriented posture is changed to the upward oriented posture. In the upward oriented posture, the opening/closing mechanism 6 opens the openings 53Aa and 53Ad and closes the openings 53Ab, 53Ac, 53Ae, and 53Af, as shown in FIG. 9D. Specifically, the openings 53Aa and 53Ad are open when they overlap with the first air vents 611c and 611a (see FIG. 7A) when viewed from the +X side, the openings 53Ae and 53Ab are closed by the closing sections 615 and 616, and the openings 53Ac and 53Af are closed when the opening/closing auxiliary sections 62 close the second air vents 612.

In the upward oriented posture, the plurality of openings 53A are grouped as follows: The openings 53Aa and 53Ad are upper openings located on the vertically upper side, and the openings 53Ab, 53Ac, 53Ae, and 53Af are lower openings located on the vertically lower side.

The air having flowed through the channel 7F is thus directed through the openings 53Aa and 53Ad toward the upper side of the light emitting section 3111a, as shown in FIG. 9D.

When the upward oriented posture is further rotated by 90° (rotated clockwise when viewed from +X side), the projector 1 can perform projection in a suspended posture in which the projector 1 is suspended from a ceiling or any other surface. The opening/closing mechanism 6 rotates when the upward oriented posture is changed to the suspended posture in such a way that the weight 64 is located on the vertically lower side. The suspended posture is a posture created by rotation of the horizontally oriented posture by 180°. In the suspended posture, the opening/closing mechanism 6 opens and closes the openings 53A in such a way that the opening/closing state thereof is reversed from the opening/closing state in the horizontally oriented posture. That is, in the suspended posture, the plurality of openings 53A are grouped as follows: The openings 53Ad, 53Ae, and 53Af are upper openings located on the vertically upper side; and the openings 53Aa, 53Ab, and 53Ac are lower openings located on the vertically lower side. The opening/closing mechanism 6 opens the opening 53Ad, 53Ae, and 53Af and closes the openings 53Aa, 53Ab, and 53Ac, as shown in FIG. 9E.

The air having flowed through the channel 7F is directed through the openings 53Ad, 53Ae, and 53Af toward the upper side of the light emitting section 3111a, as shown in FIG. 9E.

When the suspended posture is further rotated by 90° (rotated clockwise when viewed from 'X side), the projector 1 takes a downward oriented posture that allows the projector 1 to perform projection toward a floor surface. The opening/closing mechanism 6 rotates when the suspended posture is changed to the downward oriented posture in such a way that the weight 64 is located on the vertically lower side. The downward oriented posture is a posture created by rotation of the upward oriented posture by 180°. In the downward oriented posture, the opening/closing mechanism 6 opens and closes the openings 53A in such a way that the s opening/closing tate thereof is reversed from the opening/closing state in the upward oriented posture. That is, in the downward oriented posture, the openings 53Ac and 53Af are upper openings located on the vertically upper side, and the openings 53Aa, 53Ab, 53Ad, and 53Ae are lower openings located on the vertically lower side. The opening/closing mechanism 6 opens the opening 53Ac and 53Af and closes the openings 53Aa, 53Ab, 53Ad, and 53Ae, as shown in FIG. 9F.

The air having flowed through the channel 7F is directed through the openings 53Ac and 53Af toward the upper side of the light emitting section 3111a, as shown in FIG. 9F.

Although not described in detail, even in a posture that is between any adjacent two of the four postures described above (posture between horizontally oriented posture and upward oriented posture, for example) but belongs to the first posture, the opening/closing mechanism 6 opens at least part of the openings 53A located on the vertically upper side and closes at least part of the openings 53A located on the vertically lower side. The air having flowed through the channel 7F is directed through the openings 53A that are open toward the upper side of the light emitting section 3111a.

Further, the openings 53A that is an upper opening is always open in the four postures described above, but in a posture between any adjacent two of the four postures, part of the upper openings 53A is open.

As described above, in the first posture, the opening/closing mechanism 6 opens and closes the plurality of openings 53A in such a way that the upper openings located on the vertically upper side are open and at least part of the lower openings located on the vertically lower side is closed.

The air having cooled the light source 311 and hence having been heated passes through the exhaust ports 533 and 712 (see FIGS. 5A and 5B), the opening 3123 (see FIG. 2) provided in the reflector 312, and the exhaust ports 55 (see FIG. 3) provided in the cover 5B and exits out of the light source apparatus 31. The air having exited out of the light source apparatus 31 is exhausted by the exhaust fan 42 out of the exterior enclosure 2.

As described above, the light source apparatus 31 is so configured that in the first posture, the air having flowed in through the introduction pert 71G is directed toward the upper side of the light emitting section 3111a.

In a posture in which the optical axis 31Ax is slightly inclined to a horizontal plane, that is, in a posture so inclined that the opening/closing mechanism 6 rotates under its own gravity, the opening/closing mechanism 6 operates as described above, whereby the air having flowed in through the Introduction port 71G is directed toward the upper side of the light emitting section 3111a.

The air flow in the light source apparatus 31 in the second posture (vertically oriented posture) will next be described.

FIGS. 1A to 1C describe the air flow in the light source apparatus 31 in the second posture. Specifically, FIG. 1A is a diagrammatic view of the projector 1 installed on the installation surface TA in the vertically oriented posture and viewed from the +Y side. FIG. 1B is a partial cross-sectional view of the light source apparatus 31 in the second posture. FIG. 1C shows the state of one of the opening/closing auxiliary sections 62.

The second posture of the projector 1 in the present embodiment is a posture in which the light source apparatus 31 is located below the projection lens 36, as shown in FIG. 1A, and the projector 1 in the second posture projects a vertically elongated image on the screen SC (not shown in FIGS. 1A to 1C) disposed along a wall surface.

In the second posture, the opening/closing auxiliary sections 62 each have a state in which the front end of the plate-shaped section 621 is located, under its own gravity, below the shaft section 622, as shown in FIG. 1C and open the second air vents 612.

In the second posture, since the opening/closing mechanism 6 does not rotate under its own gravity, and the weight 64 can be located in any circumferential direction around the optical axis 31Ax, the first air vents 611 and the second air vents 612 open no specific opening 53A but open part of the plurality of openings 53A.

The air having flowed through the channel 7F flows through openings 53A into the light source enclosure 5, travels along the inner surface of the reflector 312, and is directed toward side portions of the light emitting section 3111a, as shown in FIG. 1B.

As described above, according to the present embodiment, the following advantageous effects can be provided.

(1) The light source apparatus 31 is so configured that in the first pasture, a greater amount of the air delivered from the cooling fan 41 is directed to the upper side of the light emitting section 3111a than to the lower side thereof. Therefore, even in any of the postures that are rotated described above but belong to the first posture, the light source 311 can be appropriately cooled.

Further, since the light source apparatus 31 is so configured that the opening/closing mechanism 6 opens and closes the openings 53A on the downstream side of the channel 7F and the amount of air flowing in through the introduction port 71G is therefore not restricted, the air delivered from the cooling fan 41 can be effectively used to cool the light source 311.

Therefore, the performance of the cooling fan 41 is fully used to efficiently suppress degradation of the light source 311, whereby the light source apparatus 31 can be used over a broadened range.

(2) Since in any posture rotated over the range from 0° to 360° described above including the horizontally oriented posture, degradation of the light source 311 is suppressed, the projector 1 can perform stable image projection over a long period in a wide variety of applications, such as not only projection on a projection surface along a wall but also projection in a variety of directions, for example, projection on a floor or a ceiling of an entrance hall or projection on a projection surface located between the floor and the ceiling.

(3) The duct member 7 not only forms, along with the light source enclosure 5, the channel 7F but also rotatably supports, along with the light source enclosure 5, the opening/closing mechanism 6 in the direction along the optical axis 31Ax. Formation of the channel 7F and arrangement of the opening/closing mechanism 6 are therefore achieved in the simple structure.

(4) The opening/closing mechanism 6 is arranged on the wall section 53W, where the openings 53A are formed, with the support section 52 of the enclosure body 5A inserted through the opening/closing body 61, which is formed in an annular shape. The configuration allows arrangement or the opening/closing mechanism 6 without significant protrusion of part of the light source apparatus 31, whereby the light source apparatus 31 can be compact even when it includes the opening/closing mechanism 6. Further, an increase in the size of the projector 1 can be suppressed because the projector 1 includes the compact light source apparatus 31.

(5) The opening/closing mechanism 6 rotates via the rotary members 63 rotating on the support section 52. The opening/closing mechanism 6 can therefore rotate against a small magnitude of resistance.

Further, the opening/closing mechanism 6 includes the weight 64 and is configured to rotate under its own gravity. The light source apparatus 31 can therefore appropriately cool the light source 311 in the simple configuration without forcing a user to perform cumbersome operation.

(6) In the light source apparatus 31, since the opening/closing mechanism 6 includes the opening/closing auxiliary sections 62 described above, which allow the light source 311 to be appropriately cooled in the first and second postures, the projector 1 can project not only a horizontally elongated image but also a vertically elongated image in a stable manner.

(7) In the light source apparatus 31, the sealing section 3111b is cooled with the air introduced through the auxiliary introduction port 53G disposed at the same location where the introduction port 71G is disposed. Therefore, in the first and second postures, the light source 311 can be further efficiently cooled.

Variations

The embodiment described above may be changed as follows.

The opening/closing mechanism 6 in the embodiment described above has the openings 53A provided at six locations. The number of locations is not limited to six and may be five or less or seven or more.

A light source apparatus may instead be so configured to accommodate an opening/closing mechanism including an opening/closing body having no opening/closing auxiliary section 62 or second air vent 612. The thus configured light source apparatus allows simplification of the configuration of the opening/closing mechanism and can be incorporated in a projector having no projection function in the second posture but capable of projection in a variety of directions in the first posture.

The opening/closing mechanism 6 in the embodiment described above is configured to close all lower openings, but part of the lower openings may be open as long as the amount of air from above the light emitting section 3111a is greater than the amount of air from below the light emitting section 3111a. That is, the opening/closing mechanism 6 only needs to close at least part of the lower openings located on the vertically lower side.

Each of the rotary members 63 in the embodiment described above has a cylindrical shape but may instead have a spherical shape.

The opening/closing mechanism may instead be configured to include no rotary member 63 or the weight 64 but may be rotated manually or by using a motor.

The opening/closing mechanism 6 in the embodiment described above is configured to take the second posture in which the light source apparatus 31 is located below the projection lens 36 and may instead be configured to take the second posture in which the light source apparatus 31 is located above the projection lens 36.

The light source apparatus 31 in the embodiment described above is so configured that the duct member 7 is directly fixed to the light source enclosure 5 with screws but is not necessarily configured this way. FIGS. 11 to 16 are plan views showing a light source apparatus 8 in a variation. Specifically, FIGS. 11 to 16 show the light source apparatus 8 viewed from the +X side, +Y side, +Z side, −X side, −Y side, and −Z side, respectively.

Figure 11:
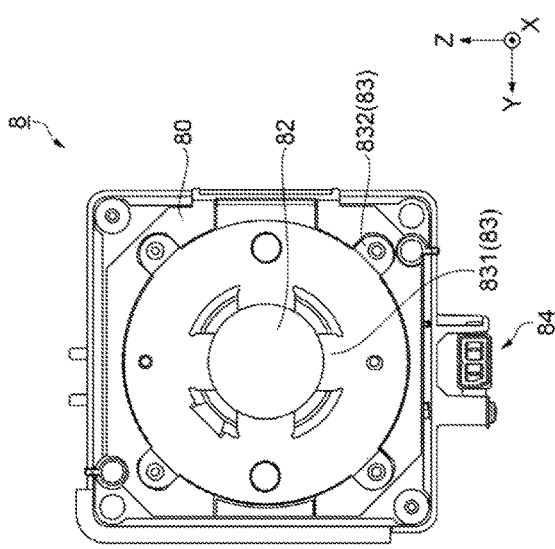
FIG. 11 is a plan view of a light source apparatus according to a variation viewed from the 'X side.
Figure 12:
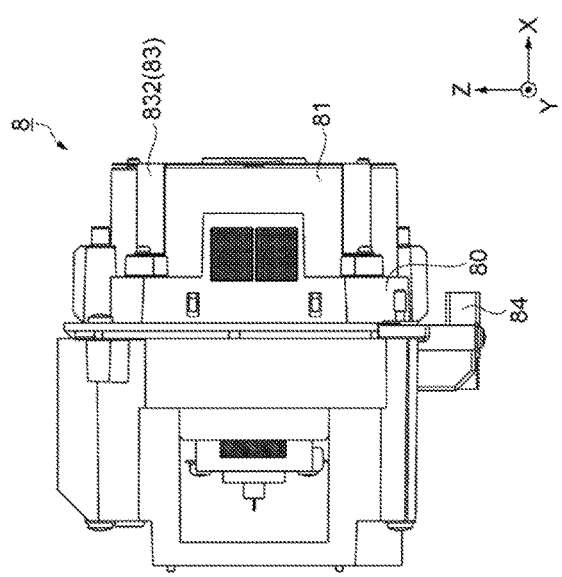
FIG. 12 is a plan view of the light source apparatus according to the variation viewed from the 'Y side.
Figure 13:
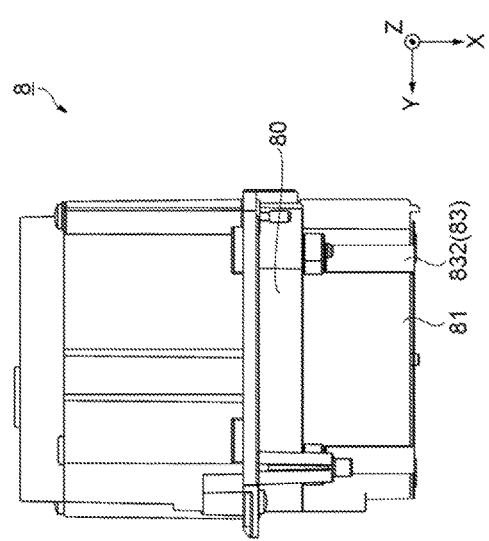
FIG. 13 is a plan view of the light source apparatus according to the variation viewed from the 'Z side.
Figure 14:
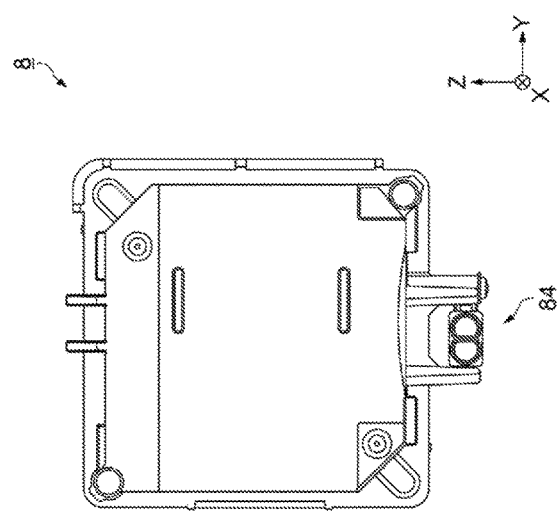
FIG. 14 is a plan view of the light source apparatus according to the variation viewed from the –X side.

The light source apparatus 8 includes a light source enclosure 8, a duct member 81, and a parallelizing lens 82, which differ from the light source enclosure 5, the duct member 7, and the parallel icing lens 313 in the embodiment described above in terms of shape and further includes a presser plate 83, as shown in FIGS. 11 to 13. The presser plate 83 is made of sheet metal and has a contact section 831, which comes into contact with a +X-side circumferential peripheral potion of the parallelizing lens 82, and a plurality of (four in the variation) fixing sections 832, which are bent extensions of the contact section 831 and fixed to the light source enclosure 8 with screws. The parallelizing lens 82 and the duct member 81 are sandwiched between the presser plate 83 and the light source enclosure 8 and fixed thereto when the presser plate 83 is fixed to the light source enclosure 8 with screws.

A connector 84 (not shown in the light source apparatus 31 in the embodiment described above) of the light source apparatus 6 in the variation is disposed at the −Z-side end of the light source enclosure 8, as shown in FIGS. 11 and 14 to 16. The connector 84 is so disposed that the side thereof to be connected to an output terminal (not shown) of the power supply faces the +X side, as shown in FIG. 11.

Figure 15:
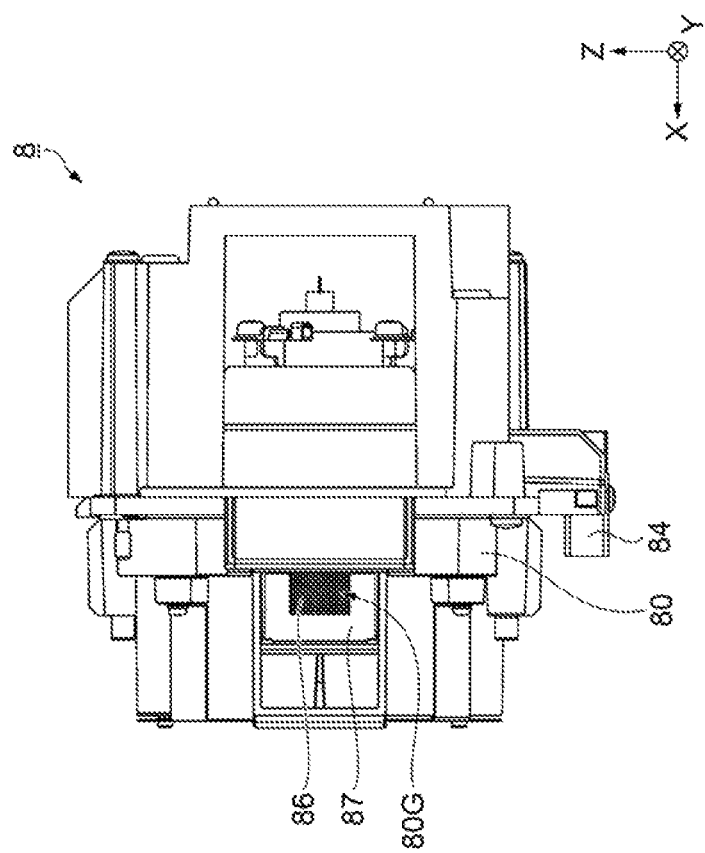
FIG. 15 is a plan view of the light source apparatus according to the variation viewed from the –Y side.
Figure 16:
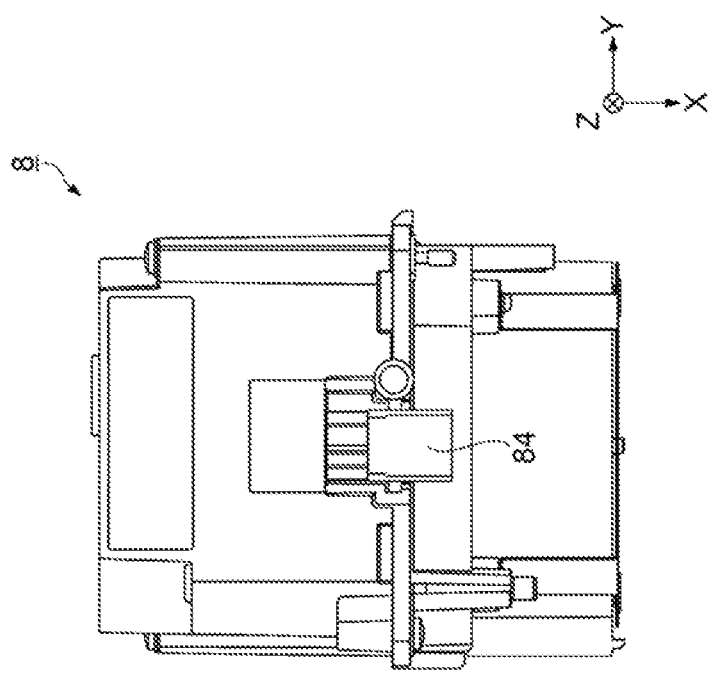
FIG. 16 is a plan view of the light source apparatus according to the variation viewed from the –Z side.

The light source apparatus 8 further includes an auxiliary introduction port 8G, which is provided in the light source enclosure 8, a mesh member 86, which is disposed in the auxiliary introduction port 8G, and a holding member 87, as shown in FIG. 15. The holding member 87 is made, for example, of sheet metal and so formed as to hold a circumferential peripheral portion of the mesh member 86, specifically, the upper and lower sides (+Z and −Z sides) and the +X side of the mesh member 86 in the present embodiment.

The projector 1 in the embodiment described above uses transmissive liquid crystal panels as light modulators and may instead use reflective liquid crystal panels. Instead, as each of the light modulators, a micromirror-type light modulator, for example, a DMD (digital micromirror device) may be used.

The light modulators in the embodiment described above employ what is called a three-panel method using three light modulators corresponding to R light, G light, and B light. The light modulators are not necessarily configured this way and may employ a single-panel method. Instead, the invention is also applicable to a projector including two light modulators or four or more light modulators.

The projector 1 according to the embodiment described above includes one light source apparatus 31. The invention is also applicable to a projector including a plurality of light source apparatus 31.

CROSS REFERENCE TO RELATED APPLICATIONS

This application claims priority to Japanese Patent Application No. 215-44379 filed on Mar. 6, 215 and No. 215-18488 filed on Sep. 18, 215, the entire contents of which are incorporated by reference herein.

What is claimed is:

1. A light source apparatus comprising:
a light source;
a light source enclosure that accommodates the light source and has a plurality of openings formed therein in a circumferential direction around an optical axis of the light source;
a channel having an introduction port through which air is introduced from outside of the light source enclosure, the channel allowed to communicate with the plurality of openings; and
an opening/closing mechanism that rotates around the optical axis to selectively open and close the plurality of openings, wherein:
the opening/closing mechanism has an opening/closing section that opens and closes the plurality of openings in a first posture in which the optical axis extends along a horizontal plane in such a way that upper openings located on a vertically upper side are open and at least part of lower openings located on a vertically lower side is closed,
the light source enclosure has a support section having a cylindrical shape around the optical axis and a wall section that protrudes from the support section and has the plurality of openings formed therein,
the opening/closing section has an opening/closing body having an annular shape through which the support section is inserted,
the opening/closing body has a first air vent that opens the upper openings in the first posture, and
the opening/closing mechanism is rotatably supported by the support section with the support section inserted through the opening/closing body.

2. The light source apparatus according to claim 1, further comprising a duct member that forms, along with the light source enclosure, the channel,
wherein the opening/closing mechanism is disposed between the duct member and the wall section.

3. A projector comprising:
the light source apparatus according to claim 2,
a light modulator that modulates light having exited out of the light source apparatus;
a projection optical apparatus that projects the light modulated by the light modulator; and
a cooling fan that delivers cooling air to the light source apparatus.

4. The light source apparatus according to claim 1,
wherein the opening/closing mechanism further includes a plurality of rotary members that protrude from an inner circumferential edge of the opening/closing body and are each supported by the opening/closing body rotatably around the a central axis parallel to the optical axis, and
the opening/closing mechanism rotates with the plurality of rotary members in contact with the support section.

5. The light source apparatus according to claim 4,
wherein the opening/closing mechanism includes a weight disposed in the opening/closing body and on the opposite side of the optical axis facing away from the first air vent.

6. A projector comprising:
the light source apparatus according to claim 5,
a light modulator that modulates light having exited out of the light source apparatus;
a projection optical apparatus that projects the light modulated by the light modulator; and
a cooling fan that delivers cooling air to the light source apparatus.

7. A projector comprising:
the light source apparatus according to claim 4,
a light modulator that modulates light having exited out of the light source apparatus;
a projection optical apparatus that projects the light modulated by the light modulator; and
a cooling fan that delivers cooling air to the light source apparatus.

8. The light source apparatus according to claim 1,
wherein the opening/closing body has a second air vent that overlaps with the lower openings in the first posture when viewed in a direction along the optical axis,
the opening/closing section includes an opening/closing assisting section that closes the second air vent in the first posture, and
the opening/closing assisting section is so supported by the opening/closing body as to open the second air vent in a second posture in which the optical axis intersects a horizontal plane.

9. A projector comprising:
the light source apparatus according to claim 8,
a light modulator that modulates light having exited out of the light source apparatus;
a projection optical apparatus that projects the light modulated by the light modulator; and
a cooling fan that delivers cooling air to the light source apparatus.

10. A projector comprising:
the light source apparatus according to claim 1,
a light modulator that modulates light having exited out of the light source apparatus;
a projection optical apparatus that projects the light modulated by the light modulator; and
a cooling fan that delivers cooling air to the light source apparatus.

11. The projector according to claim 1,
wherein the light source and the projection optical apparatus are so disposed as to extend along optical axes thereof that intersect each other.

* * * * *